Figure 4:
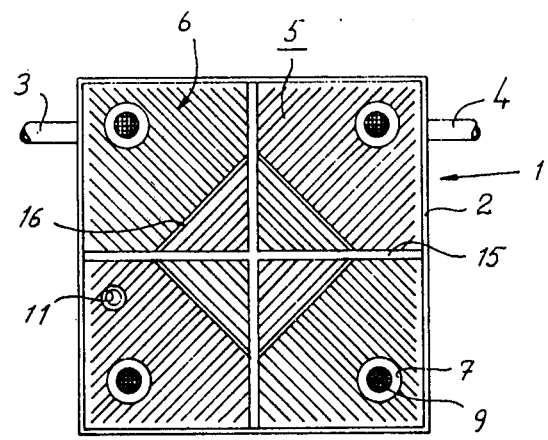

United States Patent [19]

Henttonen

[11] 4,156,324
[45] May 29, 1979

[54] METHOD AND APPARATUS FOR ARTIFICIAL IRRIGATION OF FLOWER BEDS AND GARDEN PLOTS ETC.

[75] Inventor: Anita T. Henttonen, Stockholm, Sweden

[73] Assignee: Martti Weikko Henttonen, Sweden

[21] Appl. No.: 860,066

[22] Filed: Dec. 13, 1977

[30] Foreign Application Priority Data

Dec. 14, 1976 [SE] Sweden .............................. 7614055

[51] Int. Cl.² ............................................ A01G 29/00
[52] U.S. Cl. ........................................ 47/48.5; 405/43
[58] Field of Search ........................................ 47/79–81, 47/48.5; 61/13

[56] References Cited

U.S. PATENT DOCUMENTS

| | | | |
|---|---|---|---|
| 1,052,121 | 2/1913 | Austin | 47/48.5 |
| 1,133,182 | 3/1915 | Ray | 47/48.5 |
| 1,221,449 | 4/1917 | Hitchcock | 47/80 |
| 2,346,029 | 4/1944 | Jennings | 47/80 |
| 2,653,449 | 9/1953 | Stauch | 47/48.5 X |
| 3,754,352 | 8/1973 | Bates | 47/48.5 |
| 3,857,196 | 12/1974 | Alkire | 47/48.5 |

FOREIGN PATENT DOCUMENTS

| | | | |
|---|---|---|---|
| 2610384 | 9/1976 | Fed. Rep. of Germany | 47/48.5 |
| 1301913 | 7/1962 | France | 47/81 |
| 66056 | 8/1913 | Switzerland | 47/81 |

*Primary Examiner*—Robert E. Bagwill
*Attorney, Agent, or Firm*—Larson, Taylor & Hinds

[57] ABSTRACT

A method and apparatus are provided for the artificial irrigation of plants and flower beds, garden plots, plant containers, and the like, whether indoors or outdoors. The irrigation containers are provided at spaced locations and at desired depths in the earth in the area which is to be irrigated. The dimensions of the containers are essentially less than that of the area and each irrigation container includes at least one hollow member extending through the top wall thereof and including a perforated bottom. The containers are filled with water so that the lower part of the hollow member is immersed in the water. The hollow member is filled with earth, and earth is provided over and around the irrigation containers so that the containers are entirely covered by the earth. The top of each container is provided with a plurality of perforations and the individual containers are connected to each other by means of sealed connection tubes. The plants are put into the earth above the container.

15 Claims, 7 Drawing Figures

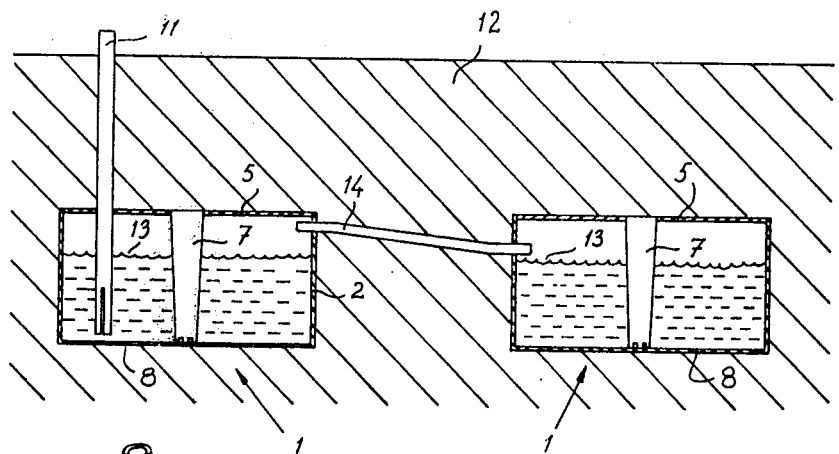
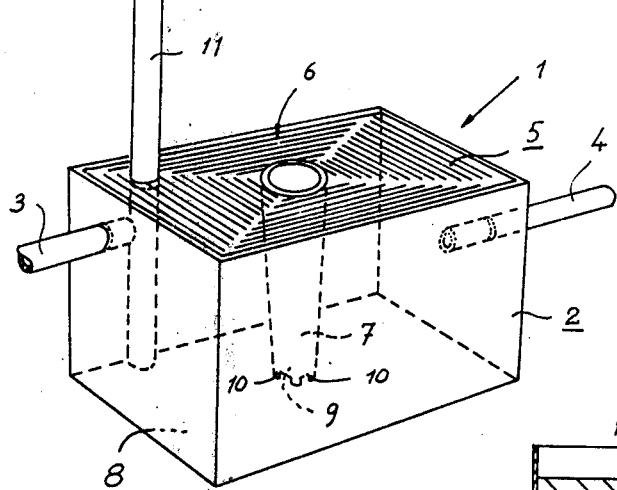
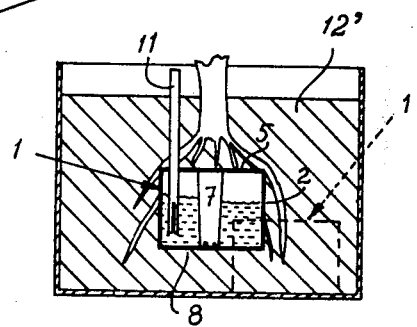
FIG. 3
FIG. 1
FIG. 2

METHOD AND APPARATUS FOR ARTIFICIAL IRRIGATION OF FLOWER BEDS AND GARDEN PLOTS ETC.

The present invention relates to a method and an apparatus for artificial irrigation of plants in flower beds and garden plots etc., which method and apparatus intends to imitate the circulation of nature itself by rain and subsequent dry periods.

When artificially irrigating plants water is generally supplied from above by squirting water or in another way. This method of irrigating plants is disadvantageous in several respects. Since the water is supplied to the plants from above the roots of the plants tend to grow towards the surface of the ground, and since the surface of the ground during dry periods get dry much quicker than the earth located further down the roots of the plants which have grown to the ground surface are subjected to a risk of withering during dry periods.

When irrigating from above it is for this reason necessary to supply water at relatively short intervals, what has as an effect that the plants cannot be left without supervision for long periods of time.

The water which is supplied from above also to a great extent gets lost due to evaporation or running away, and in order to have the water reach the roots of the plants a large amount of water has to be supplied, what often causes problem due to scarcity of water.

The water which is supplied from above also tends to form a hard crust on the ground surface, what prevents the water from penetrating into the ground and what further contributes to an insufficient irrigation function and to a bad irrigation economy. Often the water also contains different added ingredients which can be harmful to the plants like chlorine or fluorine compounds etc.

The basis of the invention therefore is the problem to provide a method and an apparatus for artificial irrigation of plants in flower beds, garden plots etc., which apparatus generally imitates the irrigation system of nature itself, and the invention in particular relates to such an apparatus having a long period action, which can be left without supervision for long periods like for instance one or several months, and in which the earth or the soil in the area adjacent the roots of the plants can make use of practically all water supplied from the irrigation apparatus, and in which the disadvantage involved in evaporation or running away of water is eliminated, the disadvantages of any added ingredients in the water are eliminated, an in which it is possible to provide strong irrigation of different parts of the earth or the soil.

According to the invention the new method one or more containers connected in series are provided on a predetermined depth in the earth underneath the plants which are to be irrigated, and the said containers are filled with water, and a preferably perforated or slotted lid is applied over the container or containers, and through said lid a hollow foot having a perforated bottom is provided, in which the foot with the lower part thereof is located immersed in the water of the container, whereupon earth is filled in the foot and over the container so that the container is completely covered by the earth, whereupon the plants are placed in the earth above or adjacent the container. The mass of earth in the foot of the container thereby soaks up a suitable amount of water to the earth above, beside and even underneath the container so that the roots of the plants will grow down into the damped earth, and at the same time the perforated or slotted lid lets vapor through which further damps the earth, and oppositely the perforations or the slots of the lid let excess of water down into the container.

Preferably a filler tube is mounted in the container or at least one of the interconnected containers, which tube extends up above the ground surface and by which the container or the system of containers can be filled with water.

The method according to the invention can be utilized both outdoors in the open earth or indoors in earth containers, especially large earth containers for domestic use, for offices and official places. In case of using the method and the apparatus indoors or otherwise in connection to cultivation containers the said containers are preferably filled with a cultivation substrate comprising turf which is mixed up with 15–30% by weight or preferably 18–24% by weight of an inert filler like burnt clay, a vulcanic material, vulcane ash, rockwool granulate or similar having a grain size of 0.3—1.8 mm or preferably 0.6–1.2 mm. In order to have an optimum soak of water into the said cultivation substrate the perforated holes at the bottom of the foot which is immersed in the water should have an average diameter of 0.5–1.5 mm.

Further characteristics of the invention will be evident from the following detailed specification in which reference will be made to the accompanying drawings which show some different embodiments of an apparatus for executing the above described method.

In the drawings

Figure 5:
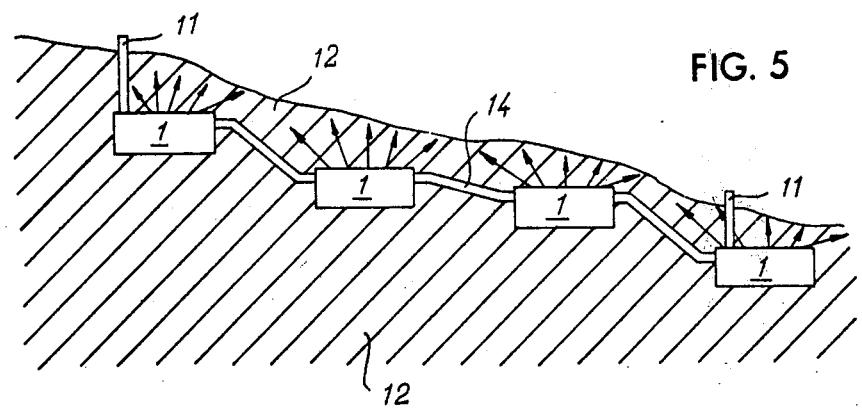
Figure 6:
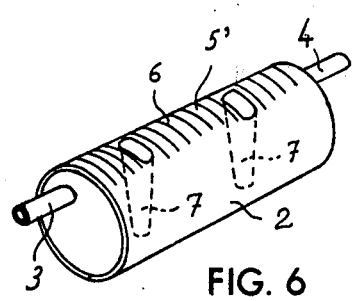
Figure 7:
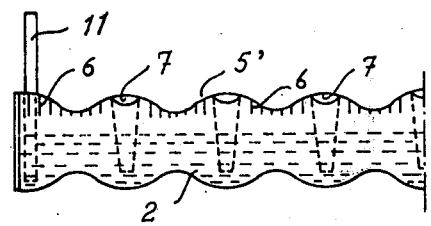

FIG. 1 is a perspective view of a container according to the invention for artificial irrigation of plants, FIG. 2 is a cross-section through an apparatus applied in an earth container for indoor use, FIG. 3 is a cross-section through an apparatus according to the invention comprising two interconnected containers for artificial irrigation provided in the earth under the plant area to be irrigated, FIG. 4 is a modified embodiment of an artificial irrigation container seen from above, FIG. 5 shows an irrigation system provided in a sloping ground area and provided in accordance with the method of the invention, FIG. 6 shows a modified embodiment of the irrigation container as shown in FIG. 2, and FIG. 7 shows a further modified embodiment of the irrigation container.

As best evident from FIG. 1 the irrigation container 1 according to the invention comprises a vessel 2 of suitable size and form like cylindric or, as shown in the drawings, having a parallepipedical cross section form. The vessel 2 may have an inlet tube 3 and an outlet tube 4 for water. At the top the vessel 2 is formed with a lid 5 which can be perforated or formed with narrow slots 6 which are sufficiently narrow to prevent earth to fall down through said slots to a substantial amount. The vessel is further formed with a foot 7 which is hollow and which with the upper end opens at the upper side of the lid 5 and with the lower end is supported by or is provided adjacent the bottom 8 of the vessel. The foot 7 is formed with a perforated bottom 9 and it is preferably formed with descending pins 10 forming spaces therebetween which allow water to penetrate the perforated bottom 9 of the foot 7. Through the lid 5 also extends a filler tube 11 which is so high as to extend a substantial distance above the lid 5 whereby the upper end thereof is located above the ground surface when the container 1 is located in the ground.

To provide the intended irrigation the above described irrigation container is provided at a suitable depth in the earth 12 or cultivation substrate, the container is filled with water whereupon earth or cultivation substrate is filled in the foot 7 of the container and the entire container is covered with earth or cultivation substrate, whereupon the plants are set in the earth above the container.

With this arrangement water is soaked from the vessel 2 and through the foot 7 via the perforated bottom 9 thereof and depending on capillary forces the soaked up amount of water spreads both horisontally and vertically over a relatively large area above and beside the foot and even to the earth beside and under the container. Since the lid 5 is preferably perforated or slotted also vapor is soaked up through the perforations or slots and contributes to a distribution of damp in the earth above the container. When the water level 13 is high in the irrigation container the earth above the container obtains a relatively high amount of humidity, but following the drop of the water level 13 the humidity grows less in a corresponding way. When water is thereafter once again filled the humidity suddenly increases, and the said cycle of slow reduced amount of humidity and thereafter a sudden increased amount of humidity immitates the circulation of nature itself during a dry period and a subsequent rain. Normally there is no need of irrigation from above when using the apparatus according to the invention, and since the water supplied by the irrigation container is directly depending on the need of the earth and the plants an optimum high portion of the water is utilized especially since there is no drainage on the surface of the ground as is the case when irrigating from above and there is practically no evaporation as when irrigating the ground surface from above. Depending on the volume of the irrigation container, the number of feet, the height and the cross-section area of the feet and the open area provided by the perforations or slots in the lid a filling of the irrigation container can meet the need of water during a long or short period of time. Normally an irrigation container according to the invention meets the need of water for the plants for a period of between several weeks and several months. The need of refilling the container can easily be observed by providing a float in the filler tube which indicates the water level in the water container in the earth.

In FIG. 2 is shown an application of the invention for indoor use, and the irrigation container 1 is provided in a container which is at least partly filled with earth or a cultavation substrate 12', preferably turf which is mixed up with 15–30% by weight or preferably 18–24% by weight of an inert filler. The water container 1 can be provided in the centre of the earth mass as shown with the full lines or at the bottom thereof as indicated with the dotted lines. As evident the roots of the plant extend both to the top of the water container and beside and under the container. This is advantageous in that the plants can provide a growth milieu which more or less exactly imitates the natural growth milieu of each particular plant. Also the user of the apparatus can set the plants according to the need of water for each particular plant in that the cultivation substrate has a higher humidity above the water container than aside thereof. Likwise the user of the apparatus can put the water container anywhere in the cultivation substrate, for instance at the bottom for plants having long roots or higher up in the substrate for plants having short roots.

It is possible to provide several water containers connected in series after each other, and in such case the outlet tube 4 from the first container is connected to the inlet tube 3 of the following container, and in this way any number of containers can be connected in series. When connecting the water containers in series as mentioned it is sufficient to provide a filler tube only for one container, the one located on the highest level, since the filling of the following containers in the series is made over the connection tube 14 between the containers.

In the embodiment of the invention shown in FIG. 4 the water container is formed with a square cross-section form and with four feet 7 provided each at one corner of the container. To provide a reinforcement of the central portions the lid 5 is formed with reinforcement ribs 15 and 16 between which the slots 6 are provided. Also in this case a filler tube 11 and an inlet tube 3 and an outlet tube 4 for connecting several water containers in series are provided if wanted.

By interconnecting several water containers a large area can be irrigated whether the said area is even or sloping as shown in FIG. 5. In said FIG. there are shown four interconnected water containers provided in a slope. Only the highest located container is formed with a filler tube 11, and the filling of the remaining containers is made over the connection tubes 14.

For best function the upper surface of the water container is provided on a level in the earth which substantially corresponds to the average level of the root ends, so that the said root ends are located at or close to the lid 5. Different plants have different depth of root, but for normal garden purposes a depth of 2 to 3 dm for the lid of the water container is considered suitable. It should however be considered what type of plants are to be set so that each plant or group of plants get an optimum of humidity.

In the embodiment of the invention shown in FIG. 6 the irrigation container is made of a piece of pipe which is closed at both ends to provide a water sealed vessel 2, and it may optionally be provided with an inlet tube 3 and an outlet tube 4. The pipe vessel should be placed lying horisontally, and the upper portion of the pipe is formed with transversal slots 6 covering an upper sector of the pipe. The slotted portion of the pipe provides a top 5' corresponding to the lid 5 of the previously described embodiments of the invention. From the top one or more suction feet 7 extend down to the lower region of the pipe which is to be filled with water. The feet 7 open at the top portion 5'. The pipe can be made in any suitable length and several pipe containers can be connected to each other over connection tubes like in the previously disclosed embodiments.

In FIG. 7 there is also shown a portion of a pipe-type irrigation container of substantially the same kind as in FIG. 6. In the latter case the pipe is corrugated in order to make it possible to bow the container upon need. This type of irrigation container is particularly suited for bow-formed garden plots etc., and also this irrigation container can be formed with inlet tube and outlet tube and other means for interconnecting several containers.

The method and the apparatus according to invention can be used both for flower beds, garden plots etc. outdoors and for apparatus and equipment indoors, and in both cases the irrigation containers are utilized as a stationary irrigation apparatus. The water containers can be made of any suitable material like plastic, stainless steel, copper or similar and containers made of such material also are resistant to frost, if any, without being deteriorated. If there is a risk of very strong frost in the ground the water of the container can be sucked out through the filler tube 11 in the autumn.

Since the water remains in the container for a relatively long period chlorine which may have been added to the water leaves the water and can be drained through the filler tube or through micro-pores in the earth. Also any other additives of the water can precipitate since the water remains stagnant in the container for a long period, or they may be converted to harmless salts by bacteriae present in the water. Further a growth promoting colony of bacteriae may be built up in the water during the relatively long stagnation of the water or may be built up in the earth around the water container which is always somewhat damp.

I claim:

1. A method for artificial irrigation of plants in flower beds, garden plots, plant containers, flower pots and the like, whether indoors or outdoors, said method comprising:
   providing a plurality of irrigation containers at spaced locations and at desired depths in the cultivation medium in the area which is to be irrigated, the dimensions of the irrigation containers being substantially less than that of the area to be irrigated,
   providing each irrigation container with at least one hollow member which extends through the top wall thereof into said container and includes a perforated bottom;
   filling said irrigation containers with water so that at least the lower part of the corresponding hollow member is immersed in the water in the associated container;
   filling each hollow member with cultivation medium and providing cultivation medium over and around the irrigation containers so that the containers are entirely covered by cultivation medium;
   providing the top of each irrigation container with a plurality of perforations;
   connecting the irrigation containers to one another by means of connection tubes which provide sealed communication between the interiors of the containers; and
   setting the plants in the cultivation medium above the irrigation containers.

2. A method according to claim 1, characterized in that at least one irrigation container is provided with a filler tube which extends up through the cultivation medium above the container to a level above the ground surface, and the irrigation container is filled or emptied of water, as needed, through said filler tube.

3. A method according to claim 8 characterized in that the irrigation containers are disposed with the upper surface thereof at a depth under the ground surface of between 2 and 4 dm.

4. A method according to claim 1 in which several irrigation containers are connected in series with each other, and only the irrigation container located on the highest level is provided with a said filler tube.

5. Apparatus for the artificial irrigation of flowers in flower beds, garden plots, plant containers or flower pots and the like, whether indoors or outdoors, said apparatus comprising a watersealed vessel containing water therein, said vessel having a lid and at least one hollow member extending through said lid down to a level in close proximity to the bottom of the water vessel so that the lower end of said hollow member is immersed in water, said at least one hollow member being filled with cultivation medium, said hollow member opening at the upper surface of said lid of the vessel and including at the lower end thereof a perforated bottom, the irrigation vessel being disposed in the earth under the area to be irrigated and the dimensions thereof being substantially less than those of the earth area to be irrigated, the top wall of said irrigation vessel including a plurality of perforations therein which provide for escape of water vapor from the water in the irrigation vessel to the earth above the vessel.

6. Apparatus according to claim 5, characterized in that the irrigation vessel container has a filler tube extending through the lid to a level above the ground surface when the irrigation vessel is located immersed in the earth.

7. Apparatus according to claim 5, characterized in that the perforations are narrow enough to substantially prevent earth particles to drop through said perforations.

8. Apparatus according to claim 7, characterized in that a plurality of irrigation vessels are connected in series with each other by means of connection tubes for connecting the interior of the said irrigation vessels with each other to make possible a transfer of water from one vessel to another and which thereby provide an air space in the vessel.

9. Apparatus according to claim 8, characterized in that the connection tube is connected adjacent the upper ends of the vessels whereby a transfer of water from one vessel to the another only occurs for a high water level in the first metioned vessel.

10. Apparatus according to claim 5 as used in combination with a plant container, wherein the dimensions of the irrigation vessel are substantially less than those of the said plant container, the irrigation vessel being disposed at a level at least half way down in the earth of said plant container.

11. Apparatus according to claim 10, characterized in that the earth of the plant container is a cultivation medium comprising turf which is mixed with 15–30% by weight of an inert filler having a grain size of 0.3 to 1.8 mm.

12. Apparatus according to claim 11, characterized in that the holes of the perforated bottom of the hollow member have an average diameter of 0.5 to 1.5 mm.

13. Apparatus as claimed in claim 11 wherein said inert filler is 18–24% by weight and said grain size is 0.6 to 1.2 mm.

14. Apparatus according to claim 5, characterized in that the irrigation vessel comprises a cylindrical pipe which is closed at both ends and have transverse slots extending along a longitudinal portion of said pipe, said portion forming the top of the irrigation vessel, and at least one hollow member extending transversely in said pipe and opening at the said top.

15. Apparatus according to claim 14, characterized in that the pipe is corrugated.

* * * * *